(12) United States Patent
Lee et al.

(10) Patent No.: US 6,673,252 B2
(45) Date of Patent: Jan. 6, 2004

(54) METHOD OF FABRICATING A REFRACTIVE SILICON MICROLENS

(75) Inventors: Choon Sup Lee, Taegu (KR); Chul Hi Han, Taejon (KR)

(73) Assignee: Korea Advanced Institute of Science and Technology, Taejon (KR)

( * ) Notice: Subject to any disclaimer, the term of this patent is extended or adjusted under 35 U.S.C. 154(b) by 473 days.

(21) Appl. No.: 09/750,135

(22) Filed: Dec. 29, 2000

(65) Prior Publication Data

US 2001/0015342 A1 Aug. 23, 2001

(30) Foreign Application Priority Data

Jan. 3, 2000 (KR) .............................................. 2000-17

(51) Int. Cl.[7] .................................................. B81C 1/00
(52) U.S. Cl. ................................ 216/2; 216/26; 216/87; 216/99
(58) Field of Search ................................ 216/2, 24, 11, 216/12, 26, 87, 99; 65/37; 264/1.1

(56) References Cited

U.S. PATENT DOCUMENTS

| | | | |
|---|---|---|---|
| 5,101,457 A | * 3/1992 | Blonder et al. ................ 385/33 |
| 5,155,412 A | * 10/1992 | Chang et al. .................. 315/14 |
| 6,001,540 A | 12/1999 | Huang et al. ................ 430/321 |
| 6,083,429 A | 7/2000 | Wester ....................... 264/1.38 |
| 2003/0007727 A1 | * 1/2003 | Ukrainczyk .................. 385/33 |

OTHER PUBLICATIONS

IBM Technical Disclosure Bulletin vol. 35, No. 4A pp. 248–249 (TDB–ACC–NO: NA9209248) Tungsten W–O Coating of Silicon Membranes, Sep. 1, 1992.*

* cited by examiner

Primary Examiner—Allan Olsen
(74) Attorney, Agent, or Firm—Foley & Lardner

(57) ABSTRACT

A method of fabricating a refractive silicon microlens by using micro-machining technology. The method of fabricating a refractive silicon microlens according to the present invention comprises the steps of forming a boron-doped region on a silicon substrate, and selectively removing regions of the substrate except for the boron-doped region to form a lens comprised of only the boron-doped region. With the method of the present invention, it is possible to fabricate a two-dimensional infrared silicon microlens array. By using such a two-dimensional infrared silicon microlens array in an infrared sensor, the detectivity of the infrared sensor can be increased by 3.4 times, which is the refraction index of silicon. In addition, the two-dimensional infrared silicon microlens array of the present invention can be used with commercial infrared telecommunication devices.

10 Claims, 7 Drawing Sheets

METHOD OF FABRICATING A REFRACTIVE SILICON MICROLENS

BACKGROUND OF THE INVENTION

1. Field of the Invention

The present invention relates to a method of fabricating a refractive silicon microlens and, more particularly, to a method of fabricating a refractive silicon microlens that can be used in the infrared range by using micro-machining technology.

2. Description of the Prior Art

The lens is a basic element for a micro-optical system. Thus, various techniques have been used to fabricate a microlens. Microlenses can be classified by its range of use, from visible ray to infrared. Microlenses can also be classified by how it is used, i.e., from diffraction lenses to refractive lenses.

A refractive microlens usable in the visible ray range is fabricated by use of techniques such as thermal reflow using surface tension, plastic molding with isotropic etching of silicon, and selective ion exchange in a glass substrate.

A Fresnel lens is a type of diffraction lens usable in both visible ray and infrared range. Because the width between etching patterns in a Fresnel lens differs depending upon the intended wavelength for the lens to be used in, it has a disadvantage that one Fresnel lens can be used for only one wavelength.

Because refractive lenses currently usable in the infrared range are fabricated by mechanical processing of silicon or germanium, the diameter of the lenses are long to a degree of several millimeters. Therefore, it was impossible to make a two-dimensional infrared microlens array for use in infrared sensors, although it is well-known that the detectivity of infrared sensors can be increased by a degree of the refractive index of the lens if infrared lenses are used in an infrared sensor.

SUMMARY OF THE INVENTION

Therefore, it is an object of the present invention to provide a method of fabricating a refractive silicon microlens that can be used in the infrared range by using micro-machining technology that is used in processing semiconductor devices.

To this end, the method of fabricating a refractive silicon microlens of the present invention comprises the steps of forming a boron-doped region on a silicon substrate, and selectively removing regions of the substrate except for the boron-doped region to form a lens comprised of only the boron-doped region.

The step of forming the boron-doped region can be carried out by one of the following three methods.

The first method of forming the boron-doped region comprises the steps of forming on the substrate a diffusion-preventive layer pattern having an aperture exposing a front face of the substrate, forming a curved portion by diffusing boron only on an exposed region of the substrate by using the diffusion-preventive layer pattern as a diffusion mask, forming a transformed diffusion-preventive layer pattern having an aperture larger than the curved portion by patterning the diffusion-preventive layer pattern such that a surface of the substrate including the curved portion is exposed, and forming a flat portion by diffusing boron on the exposed surface of the substrate using the transformed diffusion-preventive layer pattern as the diffusion mask.

The second method of forming the boron-doped region comprises the steps of forming on the substrate a diffusion-preventive layer pattern having an aperture exposing a front face of the substrate, performing isotropic etching of an exposed region of the substrate using the diffusion-preventive layer as a diffusion mask, forming a first transformed diffusion-preventive layer pattern having an aperture larger than the isotropically-etched region by patterning the diffusion-preventive layer pattern such that a surface of the substrate including the isotropically-etched region is exposed, forming a curved portion by diffusing boron on the exposed surface of the substrate using the first transformed diffusion-preventive layer pattern as the diffusion mask, forming a second transformed diffusion-preventive layer pattern having an aperture larger than the aperture of the first transformed diffusion-preventive layer by patterning the first transformed diffusion-preventive layer pattern such that a surface of the substrate including the curved portion is exposed, and forming a flat portion by diffusing boron on the exposed surface of the substrate including the curved portion using the second transformed diffusion-preventive layer pattern as the diffusion mask.

The third method of forming the boron-doped region comprises the steps of forming a diffusion-preventive layer pattern on the substrate having a plurality of apertures exposing a front face of the substrate, forming a curved portion by diffusing boron on exposed regions of the substrate by using the diffusion-preventive layer pattern as a diffusion mask, forming a transformed diffusion-preventive layer pattern having an aperture larger than the curved portion by patterning the diffusion-preventive layer pattern such that a surface of the substrate including the curved portion is exposed, and forming a flat portion by diffusing boron on the exposed surface of the substrate including the curved portion using the transformed diffusion-preventive layer pattern as the diffusion mask.

When the boron-doped regions are formed as illustrated above, the shape of the aperture(s) on the diffusion-preventive layer pattern may be a circle, square, triangle, or star. In addition, it is preferable to form the diffusion-preventive layer pattern by forming a diffusion-preventive layer such as a thermal oxide layer on both the front and back surfaces of the substrate and patterning the diffusion-preventive layer on the front surface of the substrate to expose the substrate. The diffusion-preventive layer that is remaining on the back surface of the substrate prevents diffusion of boron into the back surface of the substrate.

The step of selectively removing regions of the substrate except for the boron-doped region comprises the step of selectively wet-etching the regions of the substrate except for the boron-doped region by using an etchant selected from the group consisting of KOH, EDP (Ethylenediamine Pyrocatechol), and TMAH (Tetramethyl Ammonium Hydroxide). In this step, the boron concentration of the boron-doped region should be at least $5 \times 10^{18}$ atoms/cm$^3$ so that a certain degree of selectivity is obtained.

In order to prevent the surface of the boron-doped region from being etched in the step of selectively wet-etching, it is preferable to form a passivation layer such as a thermal oxide layer or a silicon nitride layer on the boron-doped region prior to the step of wet-etching.

DESCRIPTION OF THE PREFERRED EMBODIMENT

The method of fabricating a refractive silicon microlens according to embodiments of the present invention will be described hereinafter with reference to the attached drawings.

[The First Embodiment]

FIGS. 1A through 1G illustrate the method of fabricating a refractive silicon microlens according to a first embodiment of the present invention.

Figure 1A:
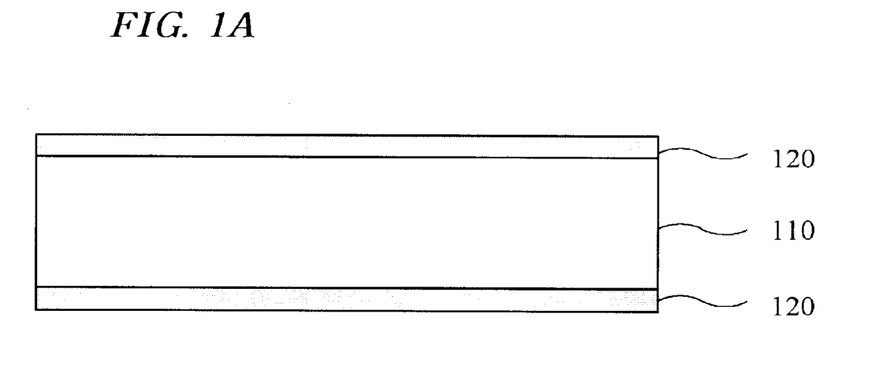
FIGS. 1A through 1G illustrate a method of fabricating a refractive silicon microlens according to a first embodiment of the present invention.

FIG. 1A is a cross-sectional view for illustrating the step of forming a diffusion-preventive layer 120, wherein the diffusion-preventive layer 120 such as a thermal oxide layer is formed on both the front and back faces of a silicon substrate 110.

Figure 1B:
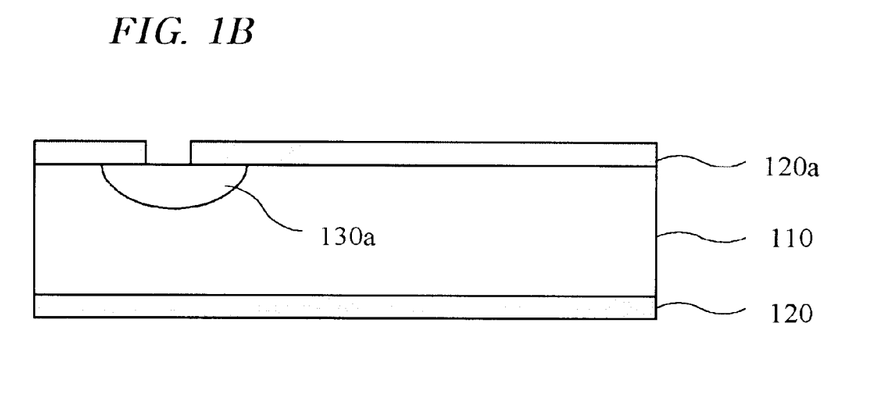

FIG. 1B is a cross-sectional view for illustrating the steps of forming a diffusion-preventive layer pattern 120a and a curved portion 130a. First, the diffusion-preventive layer pattern 120a having an aperture is formed by etching the diffusion-preventive layer 120 formed on the front face of the substrate 110 such that a region of the substrate 110 is exposed. Subsequently, the curved portion 130a is formed by diffusing boron only on the exposed region of the substrate 110 using the diffusion-preventive layer pattern 120a as a diffusion mask. During this diffusion process, the diffusion-preventive layer 120 prevents diffusion of boron on the back face of the substrate 110. The size of the curved portion 130a, i.e., the height and diameter of the lens, is determined by the temperature and time of the diffusion and drive-in processes. Accordingly, the focal length of the lens can be controlled by controlling the temperature and time of the diffusion and drive-in processes.

Figure 1C:
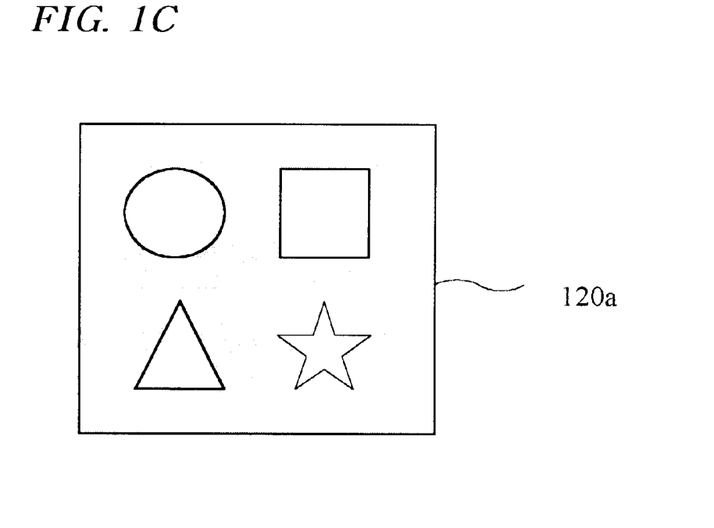

FIG. 1C is a plan view for illustrating the shape of the aperture of the diffusion-preventive layer pattern 120a. The shape of the aperture may be a circle, square, triangle, or star.

Figure 1D:
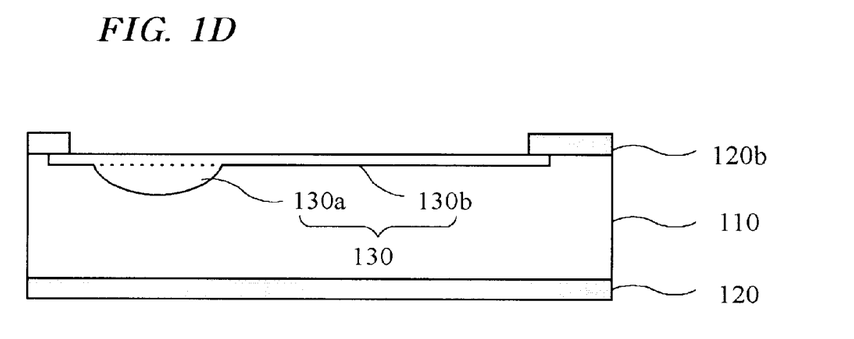

FIG. 1D is a cross-sectional view for illustrating the steps of forming a transformed diffusion-preventive layer pattern 120b and a flat portion 130b. First, a transformed diffusion-preventive layer pattern 120b having an aperture larger than the curved portion 130a is formed by patterning the diffusion-preventive layer pattern 120a such that the surface of the substrate 110 including the curved portion 130a is exposed. Subsequently, the flat portion 130b functioning as a cantilever is formed by diffusing boron on the exposed surface of the substrate 110 using the transformed diffusion-preventive layer pattern 120b as a diffusion mask. As a result, a boron-doped region 130 comprising a curved portion 130a and a flat portion 130b is formed. The boron concentration of the boron-doped region 130 should be at least $5 \times 10^{18}$ atoms/cm$^3$.

Figure 1E:
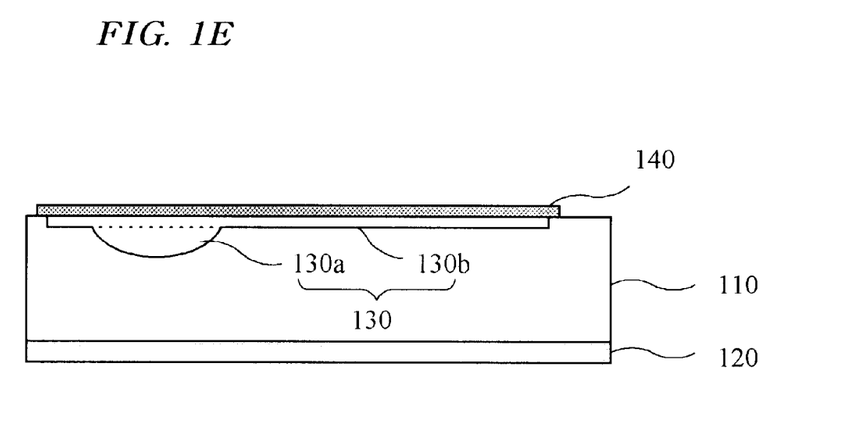

FIG. 1E is a cross-sectional view for illustrating the step of forming a passivation layer 140. First, the transformed diffusion-preventive layer pattern 120b on the front face of the substrate 110 is removed. Then, the passivation layer 140 such as a thermal oxide layer or a silicon nitride layer is formed on the boron-doped region 130. The passivation layer 140 prevents etching of the surface of the boron-doped region 130 during a subsequent wet-etching process.

Figure 1F:
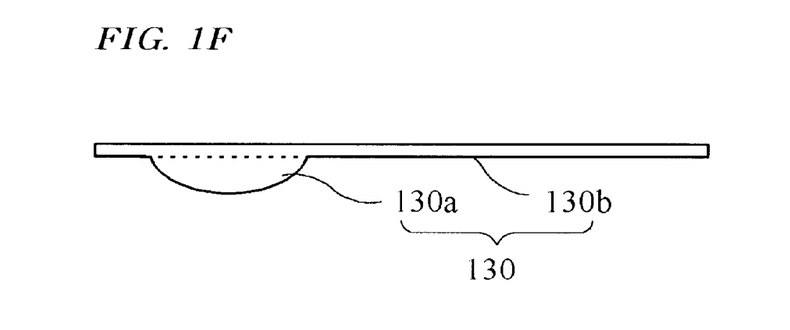

FIG. 1F is a cross-sectional view illustrating the step of forming a silicon microlens comprised of only the boron-doped region 130 by selectively removing regions of the substrate 110 except for the boron-doped region 130. First, the passivation layer 140 is removed, and the regions of the substrate 110 except for the boron-doped region 130 are selectively wet-etched using a wet etchant selected from the group consisting of KOH, EDP, and TMAH. Selective wet-etching is possible because the boron-doped region 130 with a boron concentration higher than $5 \times 10^{18}$ atoms/cm$^3$ has a highly reduced etch rate with respect to the above wet-etchants.

Figure 1G:
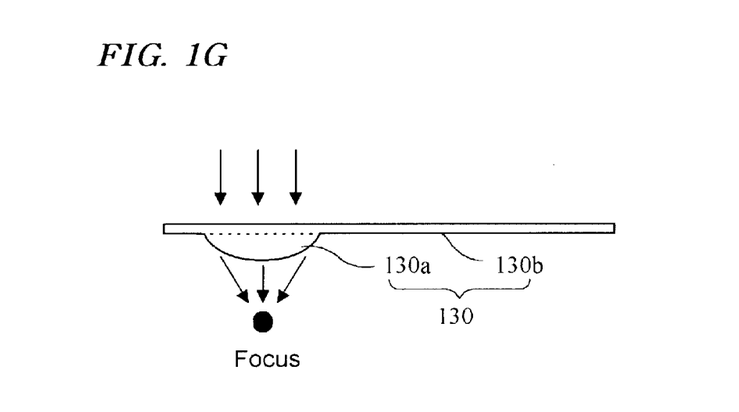

The parallel beam incident to the silicon microlens fabricated by the method illustrated in FIGS. 1A through 1F is refracted by the silicon microlens to be focused at the focal length position as shown in FIG. 1G.

FIGS. 2A through 2E illustrate the method of fabricating a two-dimensional silicon tens array by using the method of fabricating the refractive silicon microlens according to the first embodiment of the present invention.

Figure 2A:
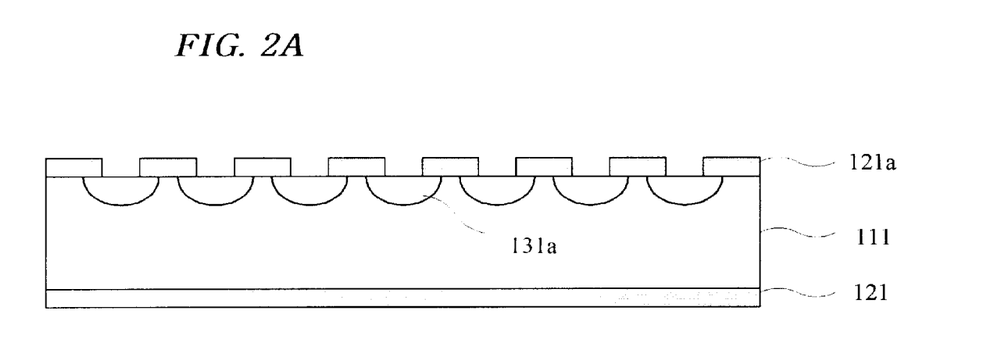
FIGS. 2A through 2E illustrate a method of fabricating a two-dimensional silicon lens array by using the method of fabricating the refractive silicon microlens according to the first embodiment of the present invention.

FIG. 2A is a cross-sectional view for illustrating the step of forming a diffusion-preventive layer pattern 121a and a curved portion 131a, wherein a diffusion-preventive layer 121 such as a thermal oxide layer is formed on both the front and back faces of a silicon substrate 111 and the diffusion-preventive layer 121 formed on the front face of the substrate 111 is etched to form the diffusion-preventive layer pattern 121a having a plurality of apertures. Subsequently, a two-dimensional array of a plurality of curved portions 131a is formed by diffusing boron only on exposed regions of the substrate 111 using the diffusion-preventive layer pattern 121a as a diffusion mask.

Figure 2B:
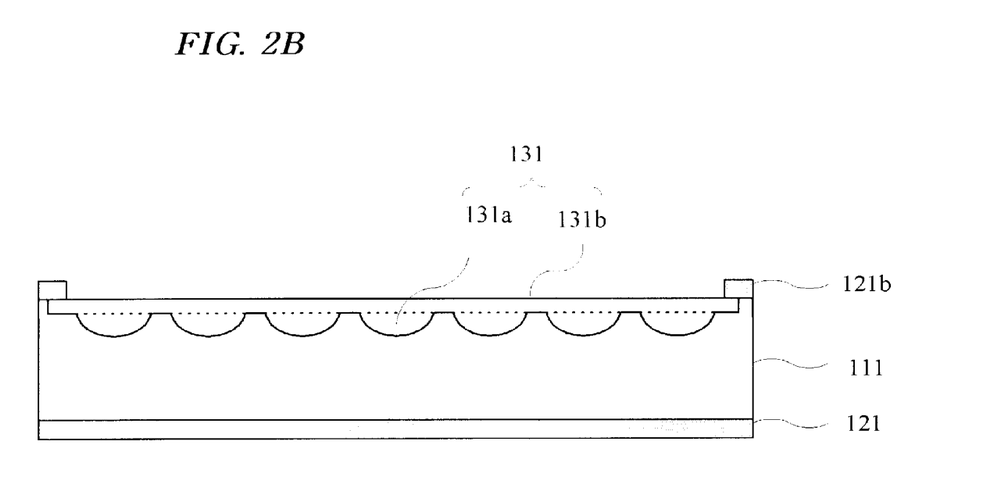

FIG. 2B is a cross-sectional view for illustrating the steps of forming a transformed diffusion-preventive layer pattern 121b and a flat portion 131b. First, a transformed diffusion-preventive layer pattern 121b is formed by patterning the diffusion-preventive layer pattern 121a such that the surface of the substrate 111 including all the plurality of curved portions 131a is exposed. Subsequently, the flat portion 131b functioning as a cantilever is formed by diffusing boron on the exposed surface of the substrate 111 using the transformed diffusion-preventive layer pattern 121b as a diffusion mask. As a result, a boron-doped region 131 comprising curved portions 131a and a flat portion 131b is formed.

Figure 2C:
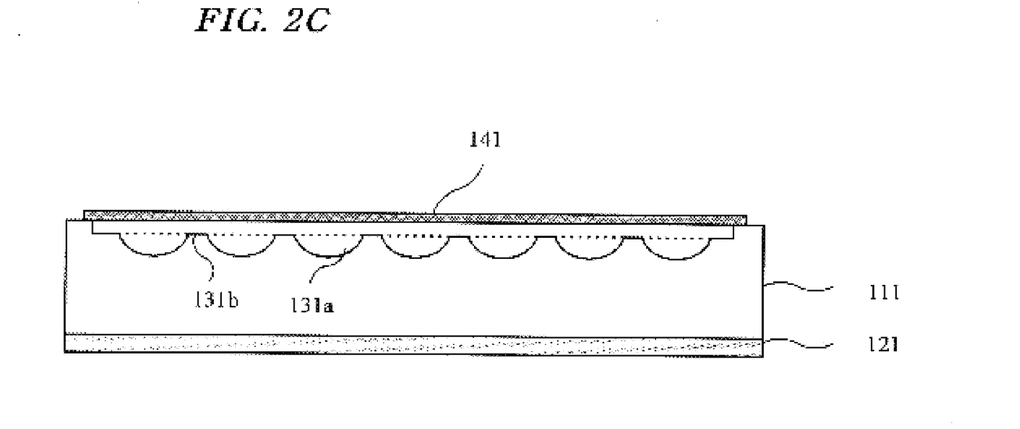

FIG. 2C is a cross-sectional view for illustrating the step of forming a passivation layer 141. First, the transformed diffusion-preventive layer pattern 121b formed on the front face of the substrate 110 is removed. Then, the passivation layer 141 such as a thermal oxide layer or a silicon nitride layer is formed on the boron-doped region 131.

Figure 2D:
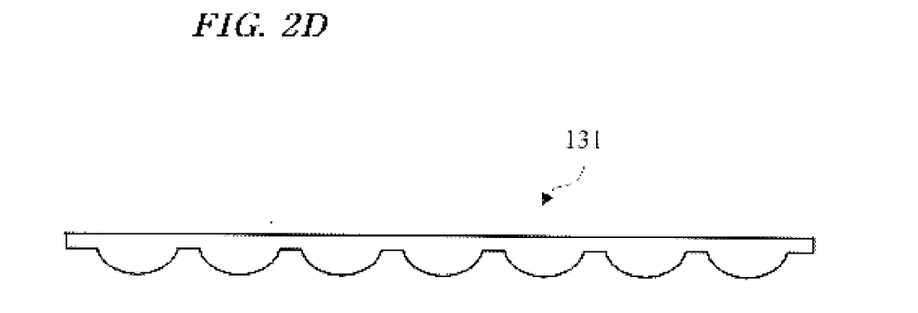

FIG. 2D is a cross-sectional view for illustrating the step of forming a two-dimensional silicon lens array comprised of only the boron-doped region 131 by selectively removing regions of the substrate 111 except for the boron-doped region 131. First, the passivation layer 141 is removed, and the regions of the substrate 111 except for the boron-doped region 131 are selectively wet-etched using a wet etchant selected from the group consisting of KOH, EDP, and TMAH.

Figure 2E:
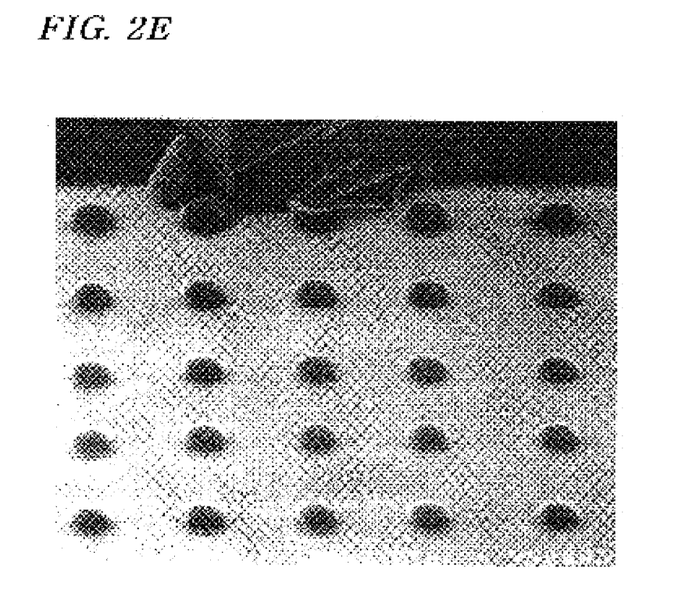

FIG. 2E is a SEM (Scanning Electron Microscope) photograph showing the two-dimensional silicon lens array fabricated by way of the method as illustrated in FIGS. 2A through 2D.

[The Second Embodiment]

FIGS. 3A through 3D illustrate the method of fabricating a refractive silicon microlens according to a second embodiment of the present invention.

Figure 3A:
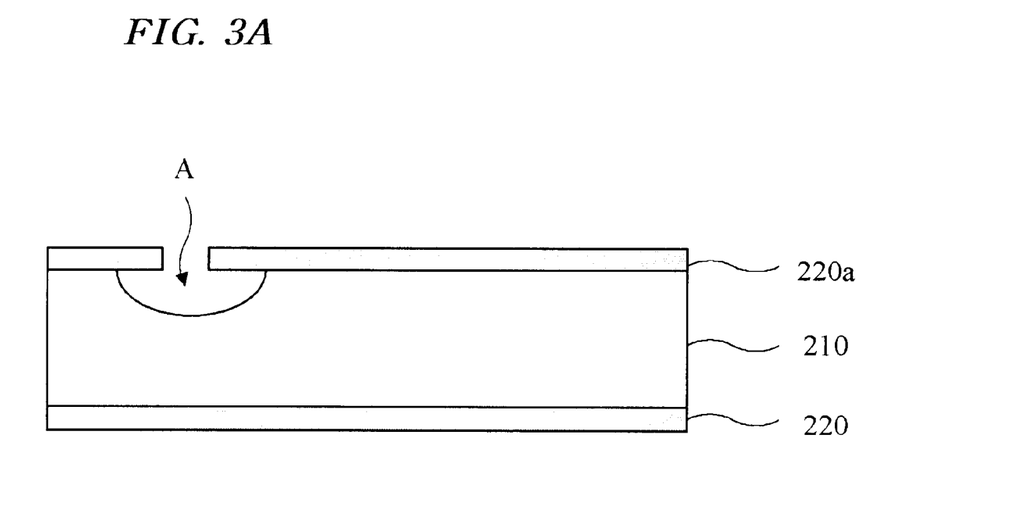
FIGS. 3A through 3D illustrate the method of fabricating a refractive silicon microlens according to a second embodiment of the present invention.

FIG. 3A is a cross-sectional view for illustrating the step of forming a diffusion-preventive layer pattern 220a and an etched-away portion A. First, a diffusion-preventive layer 220 such as a thermal oxide layer is formed on both the front and back faces of the silicon substrate 210. Then, the diffusion-preventive layer pattern 220a having an aperture is formed by etching the diffusion-preventive layer 220 formed on the front face of the substrate 210 such that a region of the substrate 210 is exposed. Subsequently, the exposed region of the substrate 210 is isotropically etched by wet-etching or dry-etching using the diffusion-preventive layer pattern 220a as an etching mask to form the etched-away portion A.

Figure 3B:
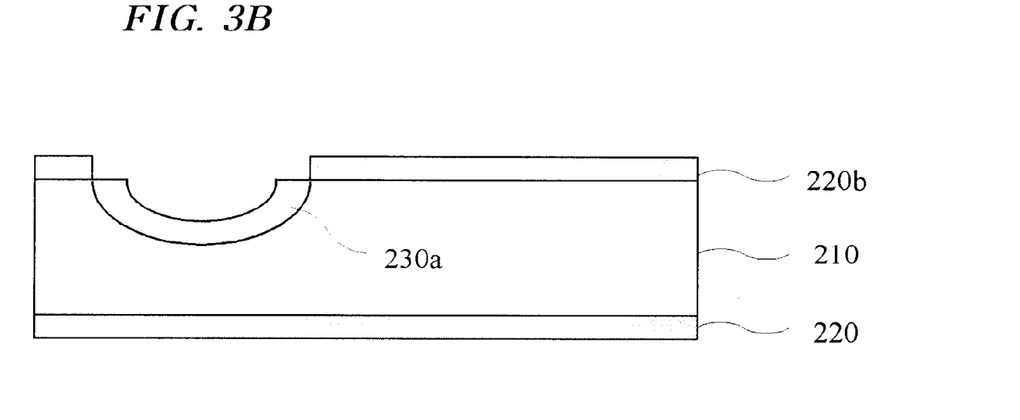

FIG. 3B is a cross-sectional view for illustrating the step of forming a first transformed diffusion-preventive layer pattern 220b and a curved portion 230a. First, a first transformed diffusion-preventive layer pattern 220b having an aperture larger than the etched-away portion A is formed by patterning the diffusion-preventive layer pattern 220a such that the surface of the substrate 210 including the etched-away portion A is exposed. Then, boron is diffused on the exposed surface of the substrate 210 using the first transformed diffusion-preventive layer pattern 220b as the diffusion mask to form a curved portion 230a.

Figure 3C:
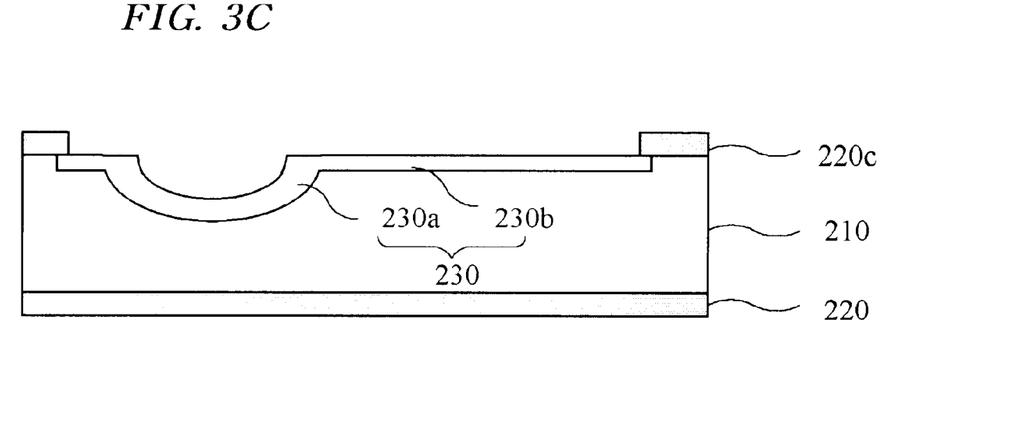

FIG. 3C is a cross-sectional view for illustrating the step of forming a second transformed diffusion-preventive layer pattern 220c and a flat portion 230b. First, a second transformed diffusion-preventive layer pattern 220c having an aperture larger than the aperture of the first transformed diffusion-preventive layer pattern 220b is formed by patterning the first diffusion-preventive layer pattern 220b such that the surface of the substrate 210 including the curved portion 230a is exposed. Then, boron is diffused on the exposed surface of the substrate 210 including the curved portion 230a using the second transformed diffusion-preventive layer pattern 220c as the diffusion mask to form a flat portion 230b. As a result, a boron-doped region 230 comprising a curved portion 230a and a flat portion 230b is formed. The boron concentration of the boron-doped region 230 should be at least $5 \times 10^{18}$ atoms/cm$^3$.

Figure 3D:
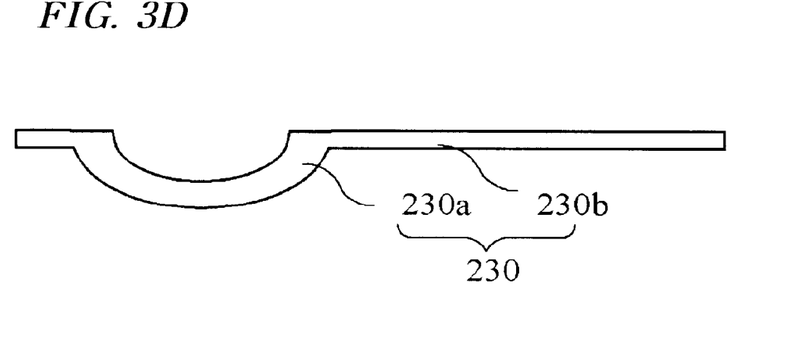

FIG. 3D is a cross-sectional view for illustrating the step of forming a silicon microlens comprised of only the boron-doped region 230 by removing regions of the substrate 210 except for the boron-doped region 230. Similarly to the first embodiment, this step is carried out by wet-etching only the regions of the substrate 210 except for the boron-doped region 230.

[The Third Embodiment]

Figure 4A:
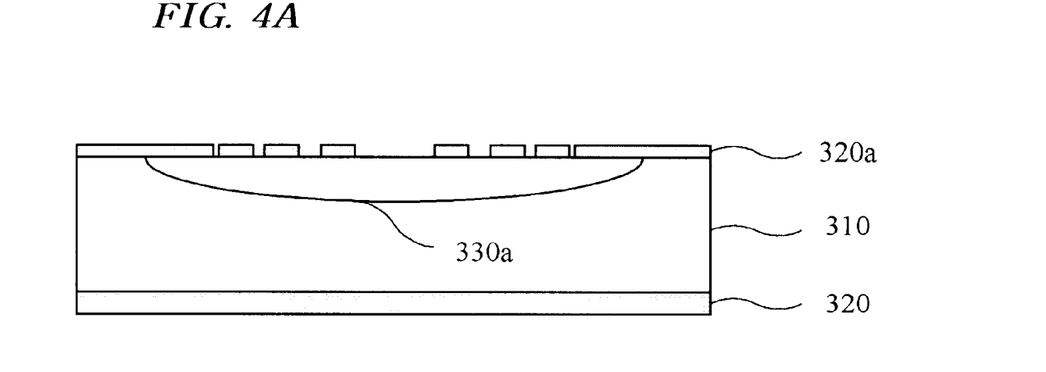
FIGS. 4A through 4C illustrate the method of fabricating a refractive silicon microlens according to a third embodiment of the present invention.
Figure 4B:
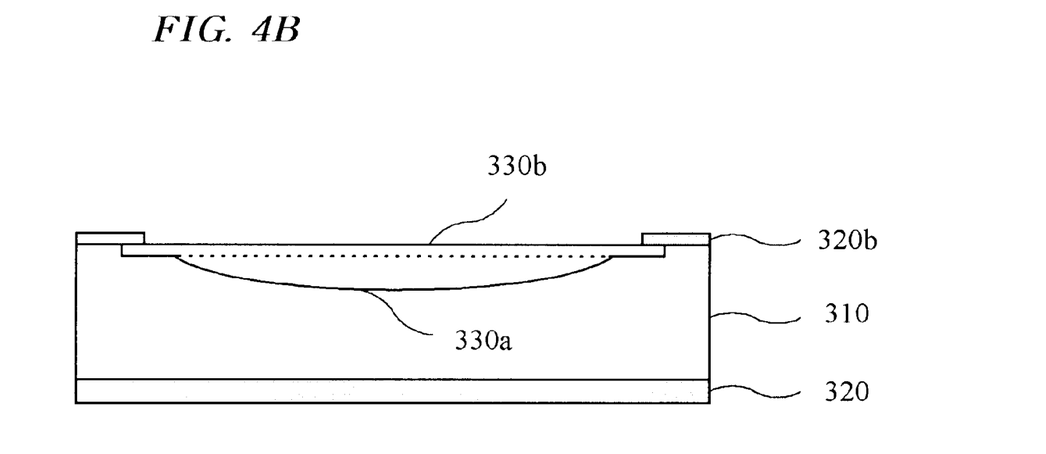
Figure 4C:
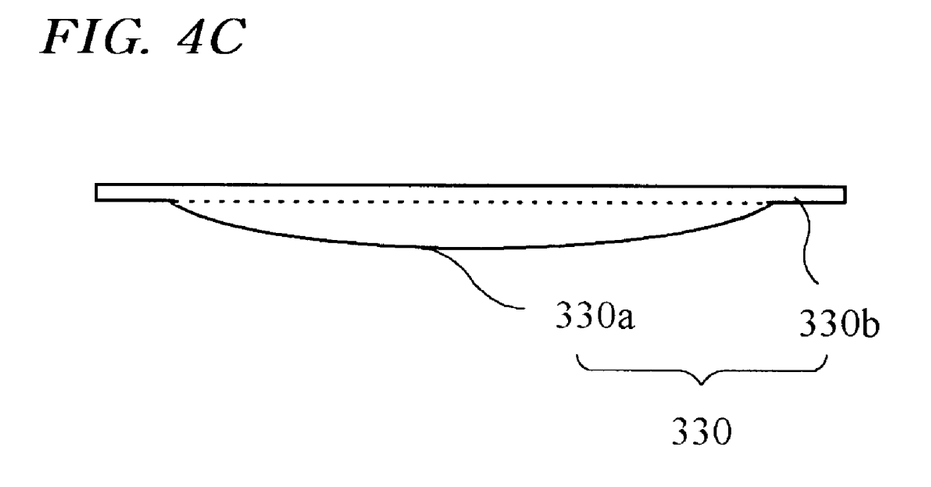

FIGS. 4A through 4C illustrate the method of fabricating a refractive silicon microlens according to a third embodiment of the present invention.

FIG. 4A is a cross-sectional view for illustrating the step of forming a diffusion-preventive layer pattern 320a and a curved portion 330a. First, a diffusion-preventive layer 320 such as a thermal oxide layer is formed on both the front and back faces of a silicon substrate 310, and the diffusion-preventive layer 320 formed on the front face of the substrate 310 is etched to form the diffusion-preventive layer pattern 320a having a plurality of apertures. Subsequently, boron is diffused only on exposed regions of the substrate 310 using the diffusion-preventive layer pattern 320a as the diffusion mask to form the curved portion 330a. The curvature of the curved portion 330a is determined by the arrangement and size of apertures formed on the diffusion-preventive layer pattern 320a. Accordingly, it is possible to adjust the focal length of the lens by controlling the arrangement and size of apertures formed on the diffusion-preventive layer pattern 320a.

FIG. 4B is a cross-sectional view for illustrating the steps of forming a transformed diffusion-preventive layer pattern 320b and a flat portion 330b. First, a transformed diffusion-preventive layer pattern 320b having an aperture larger than the curved portion 330a is formed by patterning the diffusion-preventive layer pattern 320a such that the surface of the substrate 310 including the curved portion 330a is exposed. Subsequently, the flat portion 330b is formed by diffusing boron on the exposed surface of the substrate 310 using the transformed diffusion-preventive layer pattern 320b as the diffusion mask. As a result, a boron-doped region 330 comprising a curved portion 330a and a flat portion 330b is formed.

FIG. 4C is a cross-sectional view for illustrating the step of forming a silicon microlens comprised of only the boron-doped region by selectively removing regions of the substrate 310 except for the boron-doped region 330. The selective removal of the boron-doped region 330 is carried out by the same method as illustrated with respect to the first embodiment.

The method of fabricating a refractive silicon microlens according to the present invention enables fabrication of a two-dimensional infrared silicon microlens array. By using such a two-dimensional infrared silicon microlens array in an infrared sensor, the detectivity of the infrared sensor can be increased by 3.4 times, which is the refraction index of silicon. In addition, the two-dimensional infrared silicon microlens array of the present invention can be used with commercial infrared telecommunication devices.

Although the present invention has been illustrated with reference to embodiments of the present invention, various modifications are possible within the scope of the present invention by a person skilled in the art. Therefore, the scope of the present invention should be defined not by the illustrated embodiments but by the attached claims.

What is claimed is:

1. A method of fabricating a refractive silicon microlens, the method comprising the steps of:

forming a boron-doped region on a silicon substrate; and selectively removing regions of the substrate except for the boron-doped region to form a lens comprised of only the boron-doped region.

2. The method of fabricating a refractive silicon microlens as claimed in claim 1, wherein the step of forming the boron-doped region comprises the steps of:

forming on the substrate a diffusion-preventive layer pattern having an aperture exposing a front face of the substrate;

forming a curved portion by diffusing boron only on an exposed region of the substrate by using the diffusion-preventive layer pattern as a diffusion mask;

forming a transformed diffusion-preventive layer pattern having an aperture larger than the curved portion by patterning the diffusion-preventive layer pattern such that a surface of the substrate including the curved portion is exposed; and forming a flat portion by diffusing boron on the exposed surface of the substrate using the transformed diffusion-preventive layer pattern as the diffusion mask.

3. The method of fabricating a refractive silicon microlens as claimed in claim 1, wherein the step of forming the boron-doped region comprises the steps of:

forming on the substrate a diffusion-preventive layer pattern having an aperture exposing a front face of the substrate;

performing isotropic etching of an exposed region of the substrate using the diffusion-preventive layer as a diffusion mask;

forming a first transformed diffusion-preventive layer pattern having an aperture larger than the isotropically-etched region by patterning the diffusion-preventive layer pattern such that a surface of the substrate including the isotropically-etched region is exposed;

forming a curved portion by diffusing boron on the exposed surface of the substrate using the first transformed diffusion-preventive layer pattern as the diffusion mask;

forming a second transformed diffusion-preventive layer pattern having an aperture larger than the aperture of the first transformed diffusion-preventive layer by patterning the first transformed diffusion-preventive layer pattern such that a surface of the substrate including the curved portion is exposed; and forming a flat portion by diffusing boron on the exposed surface of the substrate including the curved portion using the second transformed diffusion-preventive layer pattern as the diffusion mask.

4. The method of fabricating a refractive silicon microlens as claimed in claim 1, wherein the step of forming the boron-doped region comprises the steps of:

forming on the substrate a diffusion-preventive layer pattern having a plurality of apertures exposing a front face of the substrate;

forming a curved portion by diffusing boron on exposed regions of the substrate by using the diffusion-preventive layer pattern as a diffusion mask;

forming a transformed diffusion-preventive layer pattern having an aperture larger than the curved portion by patterning the diffusion-preventive layer pattern such that a surface of the substrate including the curved portion is exposed; and forming a flat portion by diffusing boron on the exposed surface of the substrate using the transformed diffusion-preventive layer pattern as the diffusion mask.

5. The method of fabricating a refractive silicon microlens as claimed in claim 2, wherein the step of forming the diffusion-preventive layer pattern comprises the steps of:

forming a diffusion-preventive layer on both the front and back faces of the substrate; and patterning the diffusion-preventive layer formed on the front face of the substrate to expose the substrate.

6. The method of fabricating a refractive silicon microlens as claimed in claim 5, wherein the diffusion-preventive layer is a thermal oxide layer.

7. The method of fabricating a refractive silicon microlens as claimed in claim 1, wherein the boron concentration of the boron-doped region is at least $5 \times 10^{18}$ atoms/cm$^3$.

8. The method of fabricating a refractive silicon microlens as claimed in claim 7, wherein the step of selectively removing regions of the substrate except for the boron-doped region comprises the step of wet-etching regions of the substrate except for the boron-doped region using an etchant selected from the group consisting of KOH, EDP (Ethylenediamine Pyrocatechol), and TMAH (Tetramethyl Ammonium Hydroxide).

9. The method of fabricating a refractive silicon microlens as claimed in claim 8, the method further comprising the step of forming a passivation layer on the boron-doped region prior to the step of wet-etching in order to prevent etching of a surface of the boron-doped region during the step of wet-etching.

10. The method of fabricating a refractive silicon microlens as claimed in claim 9, wherein the passivation layer is a thermal oxide layer or a silicon nitride layer.

* * * * *